(12) United States Patent
Theriault

(10) Patent No.: US 8,937,764 B2
(45) Date of Patent: Jan. 20, 2015

(54) OPTICAL SYSTEM WITH OFF-AXIS PACKAGED ILLUMINATOR

(75) Inventor: Philip Christopher Theriault, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 286 days.

(21) Appl. No.: 13/554,511

(22) Filed: Jul. 20, 2012

(65) Prior Publication Data

US 2014/0022632 A1  Jan. 23, 2014

(51) Int. Cl.
*G02B 23/08* (2006.01)
*B60R 1/10* (2006.01)

(52) U.S. Cl.
CPC .. *G02B 23/08* (2013.01); *B60R 1/10* (2013.01)
USPC .......................................... 359/419

(58) Field of Classification Search
None
See application file for complete search history.

(56) References Cited

U.S. PATENT DOCUMENTS 6,174,061 B1 * 1/2001 Cooper .................. 359/857
6,969,840 B1 11/2005 Theriault et al.

* cited by examiner

*Primary Examiner* — Jennifer L. Doak
(74) *Attorney, Agent, or Firm* — Lando & Anastasi, LLP

(57) ABSTRACT

A dual-function optical system including a secondary optical path incorporated, off-axis, within a primary optical path of the system and sharing a single aperture and at least some of the optical components with the primary optical path. In one example, an optical system includes an optical telescope including a plurality of mirrors configured to receive and direct first light rays through an entrance aperture of the optical system along a primary optical path, a detector positioned behind the optical telescope in the primary optical path and configured to receive the first light rays from the optical telescope, and an illuminator positioned behind the optical telescope and configured to produce second light rays and to direct the second light rays to the optical telescope, the optical telescope being further configured to transmit the second light rays along a secondary optical path through the entrance aperture of the optical system.

19 Claims, 7 Drawing Sheets

OPTICAL SYSTEM WITH OFF-AXIS PACKAGED ILLUMINATOR

BACKGROUND

Optical imaging systems typically comprise a detector, usually placed within a housing having an aperture through which the detector may view an external scene, and an optical subsystem that images the external scene onto the detector. For infrared imaging applications, the housing may be a cooling housing that maintains the detector at cryogenic temperatures to reduce thermal noise. The optical subsystem may be a telescope that projects a high quality image of predetermined magnification onto the detector. For many applications, the optical subsystem must be as compact as possible, while remaining consistent with required optical performance for high quality imaging.

Some systems that include optical imaging subsystems also include an optical illuminator for ranging or LADAR/LIDAR (Light Detection And Ranging; an optical remote sensing technology that is used to measure the distance to, or other properties of, a target by illuminating the target with light) purposes, for example. Some applications for these systems are such that separately packaging both the imaging subsystem and the illuminator does not pose a significant disadvantage or constraint. However, other applications have size and weight constraints that make it difficult or very disadvantageous to separately package both an aperture for the imaging subsystem and an aperture for the illuminator.

SUMMARY OF INVENTION

Aspects and embodiments are directed to a packaging solution for aperture constrained systems in which a secondary optical path is incorporated, off-axis, within the primary optical path, sharing a single aperture and at least some of the optical components of the primary optical path.

According to one embodiment, an optical system comprises an optical telescope including a plurality of mirrors optically coupled together and configured to receive and direct first light rays through an entrance aperture of the optical system along a primary optical path, a detector positioned behind the optical telescope in the primary optical path and configured to receive the first light rays from the optical telescope, and an illuminator sub-system positioned behind the optical telescope and configured to produce second light rays and to direct the second light rays through the optical telescope, the optical telescope being further configured to transmit the second light rays along a secondary optical path through the entrance aperture of the optical system.

According to another embodiment, an optical system comprises an optical telescope including a plurality of mirrors optically coupled together and configured to receive and direct first light rays through an entrance aperture of the optical system along a primary optical path, a detector positioned behind the optical telescope in the primary optical path and configured to receive the first light rays from the optical telescope, and an optical sub-system positioned behind the optical telescope and configured to form a secondary optical path between the entrance aperture of the optical system and the optical sub-system, the optical telescope being positioned at least partially in the secondary optical path and configured to direct second light rays along the secondary optical path.

In one example, the optical sub-system is an imager configured to receive the second light rays, the optical telescope being configured to direct the second light from the entrance aperture of the optical system along the secondary optical path to the imager. The imager may comprise a second detector configured to receive the second light rays and produce an image therefrom. In another example, the optical sub-system is an illuminator configured to produce the second light rays and to direct the second light rays to the optical telescope, the optical telescope being configured to transmit the second light rays along the secondary optical path through the entrance aperture of the optical system. Certain embodiments may include combinations of illumination sub-systems and imaging sub-systems. It may be advantageous to implement both types of sub-systems (illumination and imaging) in the same system in different areas of an overall system to implement both illuminator and receiver of a LADAR/LIDAR system separately from the main on-axis infrared imaging system.

The optical telescope may include a primary mirror disposed proximate the entrance aperture and configured to receive and reflect the first light rays, a secondary mirror configured to receive the first light rays reflected from the primary mirror and to reflect the first light rays, a tertiary mirror configured to receive the first light rays reflected from the secondary mirror and to reflect the first light rays, a quaternary mirror configured to receive the first light rays reflected from the tertiary mirror and to reflect the first light rays toward the detector, and a field lens optically coupled to the quaternary mirror and configured to receive the first light rays reflected from the quaternary mirror and to focus the first light rays onto the detector. The tertiary mirror may include an aperture positioned along the primary optical path, and the detector may be positioned behind the aperture, with the quaternary mirror configured to reflect the first lights to direct the first light rays through the aperture toward the detector. In one example the primary mirror and the secondary mirror are rotationally symmetric about an optical axis coincident with the primary optical path.

According to one example, the optical sub-system is an illuminator configured to produce the second light rays and to direct the second light rays to the optical telescope, the optical telescope being configured to transmit the second light rays along the secondary optical path through the entrance aperture of the optical system. The illuminator may include a first lens having a first surface and positioned such that the first surface is coincident with a surface of the tertiary mirror, the first lens being positioned within the primary optical path but off center, and the illuminator being configured to direct the second light rays through the first lens. The first lens may be configured to direct the second light rays to the secondary mirror, the secondary mirror may be configured to receive and to reflect the second light rays toward the primary mirror. The primary mirror may be configured to receive the second light rays reflected from the secondary mirror and to reflect the second light rays toward the entrance aperture.

In one example, a dichroic coating is disposed over the surface of the tertiary mirror. In another example in which the tertiary mirror and the lens are not formed as a single unit, the tertiary mirror includes an aperture configured to accommodate the first lens, wherein the first lens has a diameter approximately the same as a diameter of the aperture. In one example the detector is an infrared detector and the first light rays are infrared light rays. The tertiary mirror may be made of silicon for example, allowing the component to function as both a mirror and first lens.

Another embodiment is directed to a method of sharing a common optical aperture between a first optical system and a second optical system. The method may comprise receiving first light rays through the optical aperture, directing the first light rays along a primary optical path to an imaging detector of the first optical system using an optical telescope, and directing second light rays along a secondary optical path that is off center with respect to the primary optical path between the optical aperture and the second optical system using the optical telescope.

In one example of the method, directing the second light rays along the secondary optical path includes receiving the second light rays through the optical aperture and directing the second light rays to a second imaging detector of the second optical system using the optical telescope. In another example in which the second optical system is an illuminator, the method may further comprise producing the second light rays with the second optical system, and directing the second light rays to the optical telescope, wherein directing the second light rays along the secondary optical path includes transmitting the second light rays along the secondary optical path through the optical aperture of the optical system.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

As discussed above, in certain applications there are constraints that make using separate apertures for imaging and illumination functions highly disadvantageous or difficult. For example, a missile has aerodynamic requirements that dictate a small frontal cross-section. This small cross-section limits the optical aperture available for light collection. Applications such as missile defense require as large an aperture as possible to collect as much light as possible and to improve diffraction performance. Accordingly, splitting the available aperture among two functions (imaging and illumination, for example) may severely impact performance of at least the imaging function. Aspects and embodiments are directed to a solution that allows packaging an illuminator or other secondary optical path inside the primary optical path of an optical system, such as an optical imaging system. As discussed in more detail below, according to one embodiment, an off-axis portion of an axial optical system is used as a separate off-axis optical system sharing at least two mirrors. At least one of these mirrors may be used as both a lens (for focusing the secondary optical path) and a mirror as one component of the axial imaging system.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
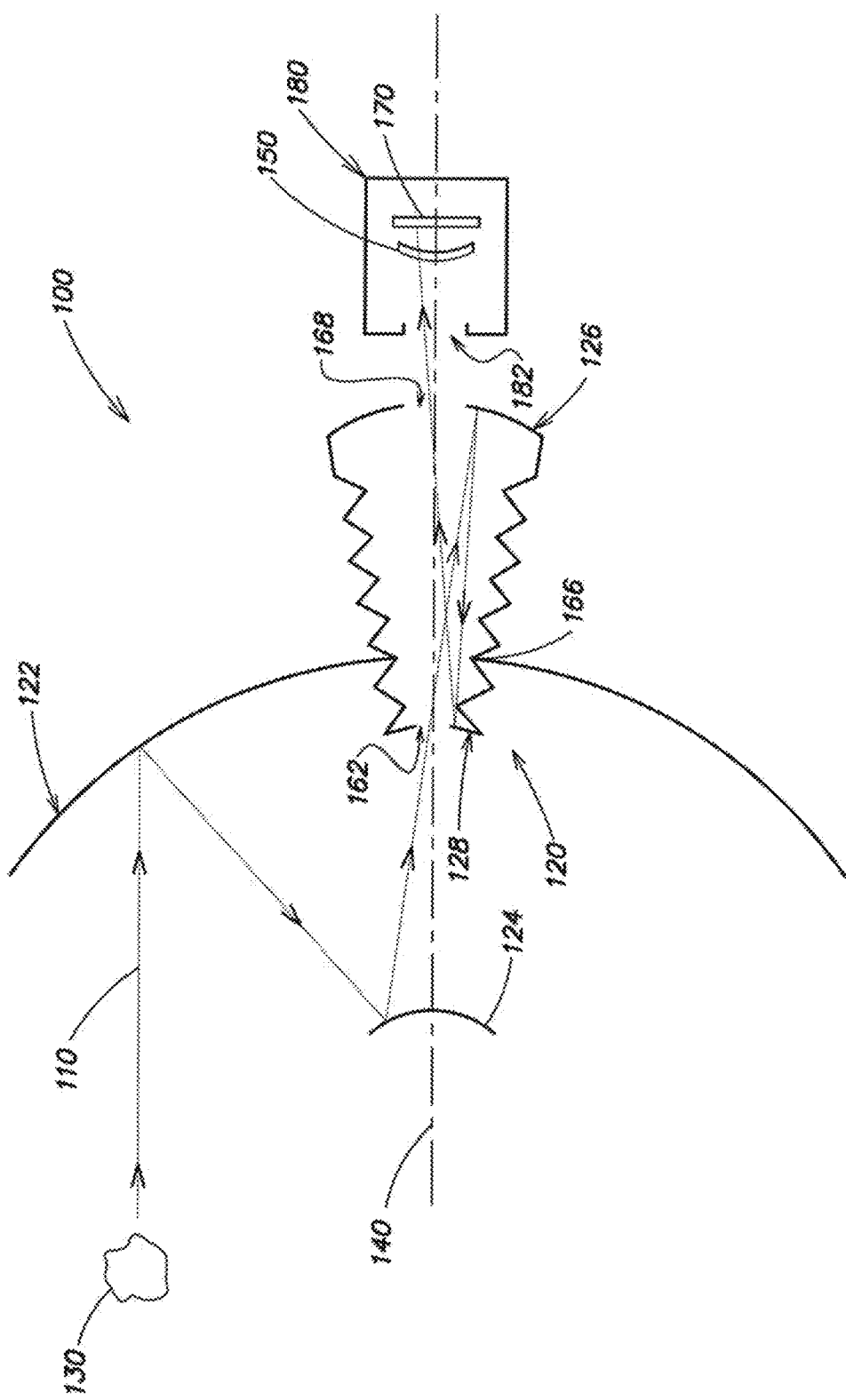
FIG. 1 is a block diagram of one example of a conventional optical imaging system.

Referring to FIG. 1, there is illustrated a block diagram of one example of a conventional axial optical imaging system. The optical imaging system 100 includes a telescope 120 that has a positive-optical-power primary mirror 122 that receives light 110 from an external source 130. The light 110 may be of any operable wavelength, but in some examples is infrared light. A negative-optical-power secondary mirror 124 receives the light 110 reflected from the primary mirror 122. A positive-optical-power tertiary mirror 126 receives the light 110 reflected from the secondary mirror 124. A negative-optical-power quaternary mirror 128 receives the light 110 reflected from the tertiary mirror 126. The light 110 reflected from the quaternary mirror 128 passes through a positive-optical-power field lens 150. In one example, the optical system comprising the primary mirror 122, the secondary mirror 124, the tertiary mirror 126, the quaternary mirror 128, and the field lens 150 is such as to produce a high quality planar or near-planar (due to very small remaining aberrations) final image.

The primary mirror 122, the secondary mirror 124, the tertiary mirror 126, the quaternary mirror 128, and the field lens 150 are axisymmetric about the system optical axis 140. To permit this axial symmetry, the light 110 reflected from the secondary mirror 124 passes through a quaternary-mirror central opening 162 in the quaternary mirror 126 and a system stop, and through a primary-mirror central opening 166 in the primary mirror 122. After reflecting from the quaternary mirror 128, the light 110 passes through a tertiary-mirror central opening 168 in the tertiary mirror 126. The four-mirror telescope 120 provides the benefits of an intermediate field stop (quaternary mirror central opening 162), a wide field of view, a high quality image, an opportunity to utilize a warm aperture stop, and a compact configuration. Examples of such a four-mirror telescope are described in U.S. Pat. No. 6,969,840 which is incorporated herein by reference in its entirety.

After passing through the tertiary mirror central opening 168 and through the field lens 150 and thereby leaving the telescope 120, the light 110 is imaged on a detector 170. In some examples, the detector 170 is an infrared detector. In one example, the infrared detector 170 is a focal plane array (FPA), on which the light 110 image forms and is quantified with a series of sub-elements that define a pixel array. The set of optical elements, in the form of the mirrors 122, 124, 126 and 128, and the field lens 150, together direct the light 110 to be incident upon the detector 170. As discussed above, the detector 170 may be housed in a housing 180, which in some examples is a cooling housing, such as a cryogenic Dewar. The housing 180 includes an entrance window 182 positioned so that the light 110 reflected from the quaternary mirror 128 can enter the interior of the housing 180 and be incident upon the field lens 150 and thence the detector 170.

According to one embodiment, an axial optical imaging system, such as imaging system 100, may be modified to incorporate an off-axis secondary optical path, as discussed above.

Figure 2:
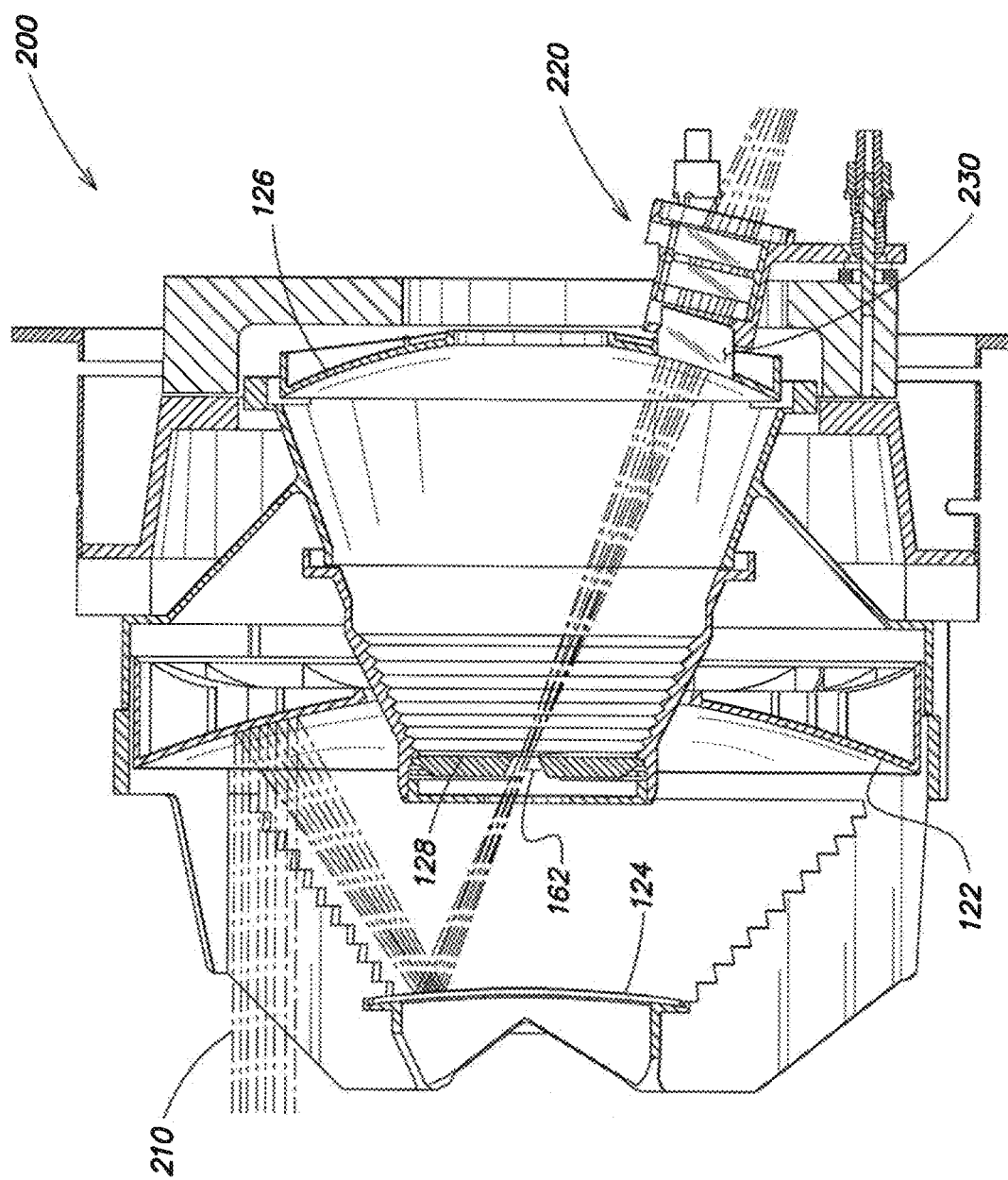
FIG. 2 is a diagram showing a cross-sectional view of one example of an optical system according to aspects of the invention.

Referring to FIG. 2, there is illustrated one example of an optical system configured to allow a primary optical path and a secondary optical path to share a common aperture. The optical system 200 includes an embodiment of the telescope 120 discussed above. In one embodiment, the primary optical path through the optical system 200 is as discussed above with respect to FIG. 1, and the telescope 120 directs a light beam to a detector (not shown in FIG. 2) to image an external scene. A sub-portion of the field of view 210 operates with a secondary optical path through the optical system 200 to/from a secondary sub-system 220 positioned behind the tertiary mirror 126. In one embodiment, the secondary sub-system 220 includes an illuminator, in others it is used to image in a very different wavelength band of light. Accordingly, the light 210 may originate from the secondary sub-system 220 and be transmitted through the optical system 200 to the exterior. However, in other examples, the secondary sub-system 220 may include an imaging system or other light-receiving system, and therefore the light beam 210 may travel from the exterior through the optical system 200 to the secondary sub-system 220, similar to the travel of the light 110 discussed above. Accordingly, although the following discussion may refer primarily to a transmitted light beam 210, it will be appreciated by those skilled in the art, given the benefit of this disclosure, that an equivalent reverse path may be travelled by a received light beam 210. In some embodiments it may be advantageous to implement both types of supplemental optical paths in separate sections of the tertiary mirror.

Figure 3:
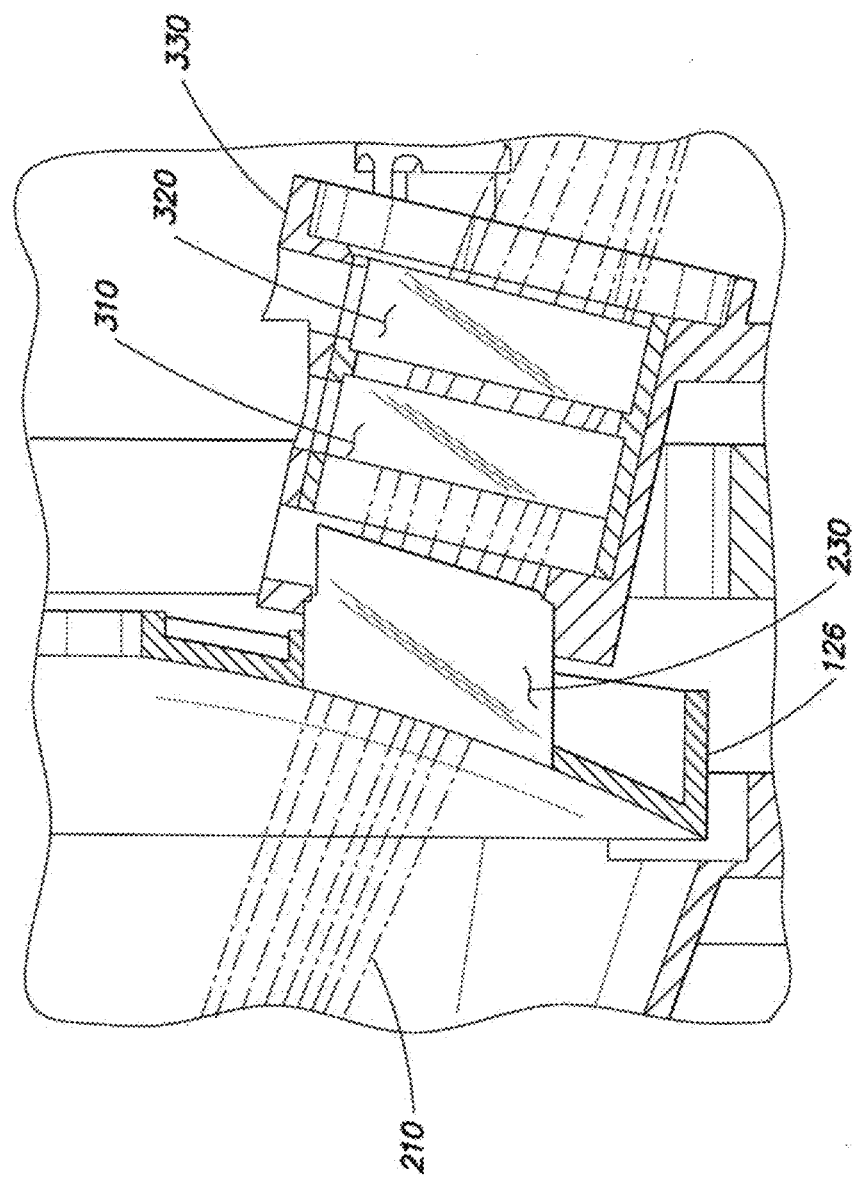
FIG. 3 is an enlarged view of a portion of the optical system of FIG. 2.

According to one embodiment, the light 210 is transmitted by the secondary sub-system 220 through the tertiary mirror 126, as shown in FIG. 2. As discussed above, the tertiary mirror 126 is also used to reflect the light 110 in the primary optical path. The optical system 200 also includes a lens 230 having a first surface coincident with the surface of the tertiary mirror 126. The lens group 230, 310, 320 (as shown in FIG. 3) is used to focus and direct light beams 210 along the secondary optical path. FIG. 3 illustrates an enlarged view of the portion of optical system 200 including the secondary sub-system 220, showing the lens 230 coincident with the front surface of the tertiary mirror 126 and the light 210 of the secondary optical path passing through the lens 230. In one embodiment the tertiary mirror may be configured to be reflective to light in the wavelength range of the primary light beam 110 and transmissive to light in the wavelength range of the secondary light beam 210. Accordingly, the secondary optical path may pass through the tertiary mirror 126. For example, the entire tertiary mirror 126 may be manufactured from a material that is transmissive in the wavelength range utilized by the secondary optical sub-system. The tertiary mirror 126 may be provided with a coating, such as a dichroic coating, that changes the transmission/reflection properties of the mirror at different wavelengths. In another example, the lens 230 is aligned with an aperture in the tertiary mirror 126. In this embodiment, the light beam 210 is transmitted through the lens 230 and the aperture in the tertiary mirror 126, such that the mirror does not influence the secondary optical path. The tertiary mirror 126 and the lens 230 together may provide a dual-use mirror/lens combination. To minimize the effect of the secondary optical sub-system on the primary optical system, lens 230 may be optically coated such as to reflect light in the wavelength band used in the primary optical system and transmit light in the wavelength band used by the secondary optical sub-system.

As discussed above, in some examples, the detector 170 of the imaging sub-system is an infrared detector. Accordingly, the mirrors of the telescope 120 may be formed of a material, or coated with a material, that is opaque to infrared radiation and may be polished to acceptable optical quality. In one example of the optical system 200, the primary mirror 122, secondary mirror 124 and/or quaternary mirror 128 are silicon carbide (SiC) mirrors; however, any suitable material may be used. Single crystal silicon (SCSi) has a coefficient of thermal expansion that is very similar to that of silicon carbide. Furthermore, although single crystal silicon has different mechanical properties compared to silicon carbide, its mechanical performance in the context of an optical system such as optical system 200 is very similar. Single crystal silicon is transparent to short wave infrared radiation, for example, at a wavelength of approximately 1.55 micrometers ($\mu$m), which is a common wavelength for infrared laser sources such as may be used in illuminators or LADAR. Accordingly, in one embodiment, the tertiary mirror 126 may be formed of single crystal silicon to allow the secondary sub-system 220 to transmit the light beam 210 through the tertiary mirror 126, in addition to the mirror being used to reflect the primary light beam 110, as discussed above.

Figure 4A:
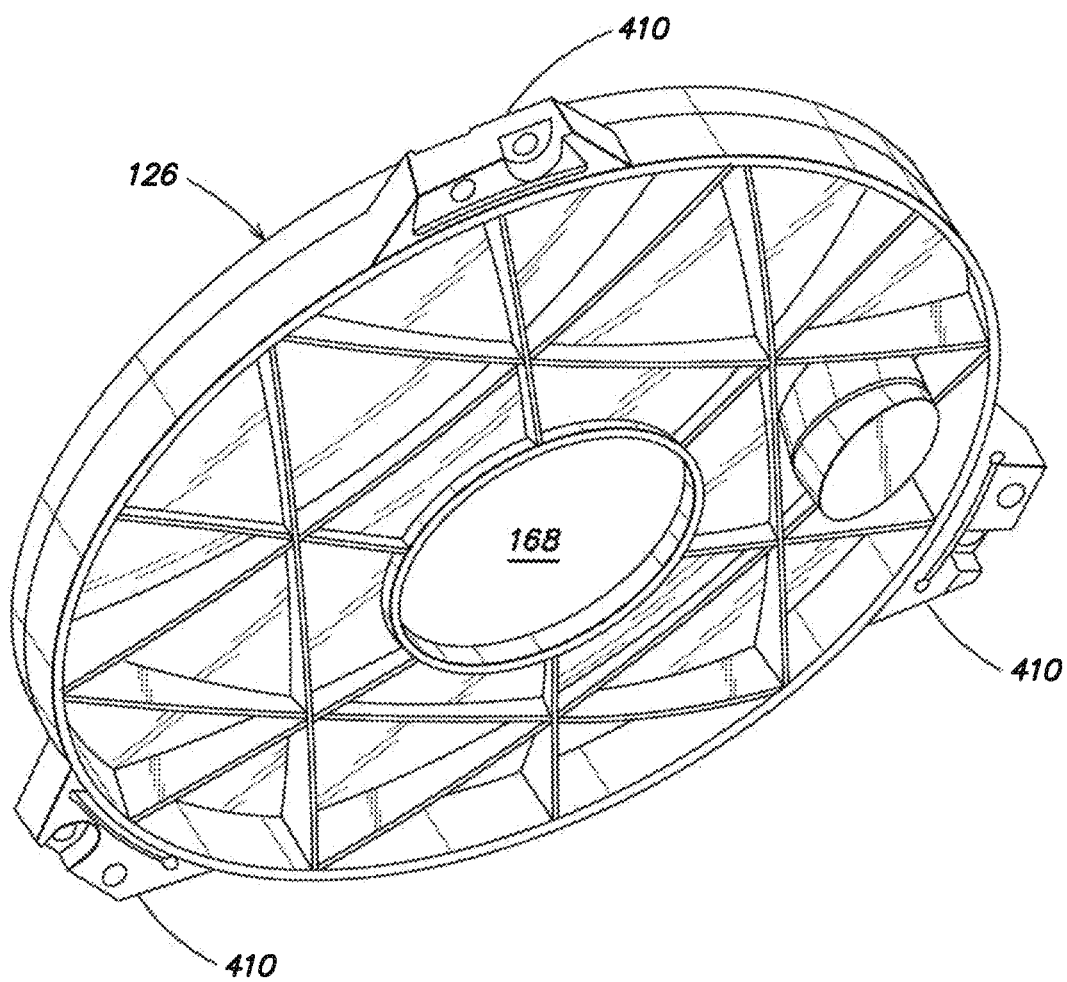
FIG. 4A is a diagram of one example of a mirror according to aspects of the invention.
Figure 4B:
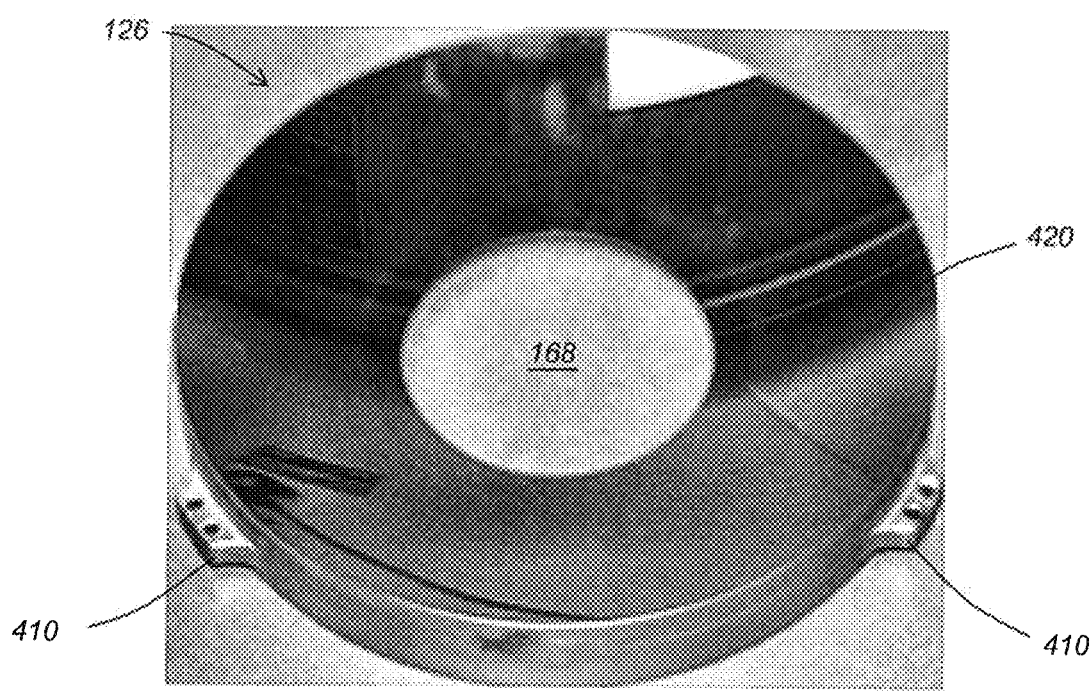
FIG. 4B is an image of an example of the mirror surface of the mirror of FIG. 4A.

Referring to FIGS. 4A and 4B there is illustrated an example of a mirror 126 that may be used as the tertiary mirror 126 in the system of FIG. 2, and which may accommodate the lens 230 for the secondary optical path, as discussed above. In one example, the mirror 126 is made of silicon, for example, single-crystal silicon, as discussed above. The mirror 126 includes flanges 410 for mounting the mirror in the optical system 200. The mirror 126 includes an aperture 168, as discussed above with respect to FIG. 1, to allow the light reflected from the quaternary mirror 128 to pass through to the detector 170. The front surface 420 of the mirror 126 may be polished to provide a highly reflective mirror surface, as illustrated in FIG. 4B. The rear surface of the mirror 126, illustrated in FIG. 4A, may be formed with various ridges, struts or other structural features to provide a structurally stable, light-weight mirror. In certain examples, the mirror 126 may be optimized for the primary, imaging function or optical path, since the light beam 210 on the secondary optical path may pass through the mirror itself or through an aperture in the mirror with little effect. In some examples, the lens 230 may be fastened to the structural elements of the telescope system that the mirror 126 is also fastened to. If the waveband of the illuminator (or other secondary sub-system 220) is not compatible with a reasonable mirror material, the materials of the mirror 126 and lens 230 may be chosen for independent characteristics, for instance a glass that closely matches the thermal coefficient of expansion but not the modulus, density, hardness and malleability of the mirror material.

According to one embodiment, as discussed above, the mirror 126 may also be constructed with another aperture (as shown in FIG. 3) to accommodate the lens 230. For example, this configuration may be used where the material selected for the mirror 126 is not sufficiently transparent to light in the waveband of the secondary optical sub-system 220. Accordingly, in one example, the lens 230 may have a diameter closely matching that of the aperture in the mirror 126 and may be inserted into the aperture or positioned coincident with the aperture. In one example, the lens 230 is constructed with a front surface that closely or even exactly matches the front surface of the mirror 126 in both shape and position. The front surface of the lens may also be polished to provide a highly reflective surface similar to or the same as that of the mirror 126. Accordingly, to the light beams 110 on the primary optical path, the lens may be virtually indistinguishable from the mirror 126, and the entire dual-use mirror/lens combination may be available for the primary imaging function. In one example, as discussed above, a continuous dichroic coating may be applied over the surface of the tertiary mirror 126 and over the coincident surface of the lens 230 to allow the combination structure to be used for both the primary and secondary functions.

Positioning the secondary sub-system 220 behind the fore-optics (e.g., telescope 120) of the primary (e.g., imaging) sub-system and using the primary aperture for the secondary sub-system may provide significant benefits, particularly in terms of the size of the dual-function optical system 200. However, the secondary sub-system 220 is off-axis with respect to the telescope 120. Accordingly, the optical system 200 must be designed with an optical prescription that allows at least the mirrors 122 and 124 an opportunity to be used for the primary optical path and for the secondary optical path in small portion of the full primary system.

In addition, referring again to FIG. 3, the secondary sub-system 220 includes a series of refractive lenses with the front lens 230 positioned with a surface coincident with the surface of the tertiary mirror 126, as discussed above. In the example illustrated in FIG. 3, the secondary sub-system 220 includes two additional lenses 310 and 320 that direct and focus the light beam 210 through the front lens 230 and through the aperture 162 in the quaternary mirror 128. The light beam 210 in the secondary optical path passes through the aperture 162 in the quaternary mirror 128 and is reflected by the secondary mirror 124 onto the primary mirror 122 which reflects the beam out through the aperture of the optical system 200. The lenses 230, 310 and 320 may be accommodated at least partially within a housing 330. In one embodiment, the mirrors 122, 124, 126 and 128 of the telescope 120 are rotationally symmetric, suitable for the on-axis primary optical path; however, the lenses 230, 310 and 320 that direct the secondary optical path are not rotationally symmetric. In one example, several of the surfaces of the lenses 230, 310 and 320 are shifted laterally and tilted relative to the next surface in sequence, as shown in FIG. 3.

Figure 5:
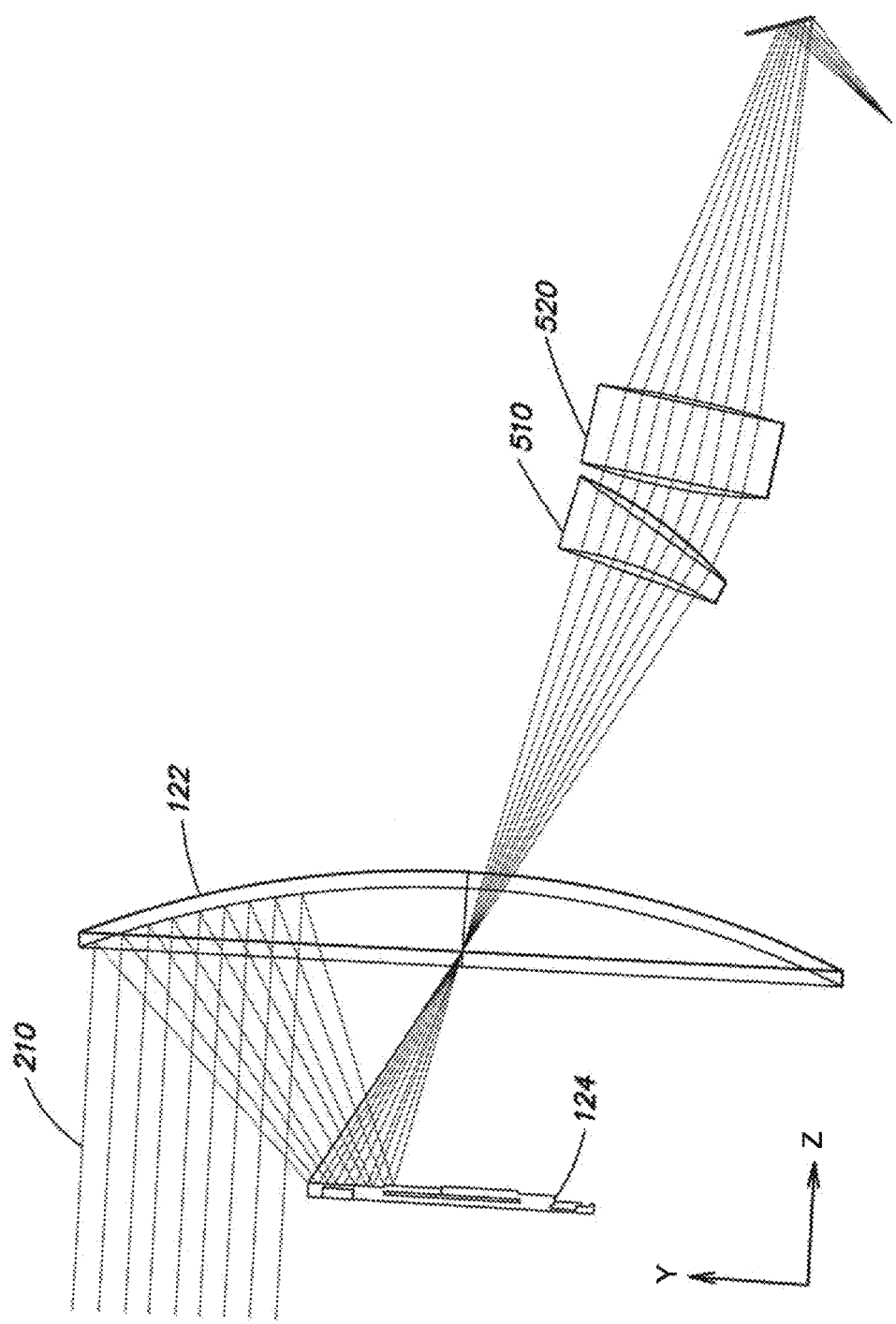
FIG. 5 is a ray trace of one example of an optical system including a two lens illuminator, according to aspects of the invention.

Table 1 below provides an optical prescription for an example of an optical system including a two lens (510, 520) illuminator and corresponding to the ray trace illustrated in FIG. 5. The optical prescription for this example of the optical system may be described using an equation for each surface which is an industry standard and which would be known to those skilled in the art. It is to be appreciated however, that the prescription given in Table 1 is merely exemplary, and that the prescriptions of various embodiments of the optical system are determined by the intended imaging task to be performed by the optical system. The example corresponding to the prescription given in Table 1 has a 5.335 inch telescope aperture.

TABLE 1

| Surface | Radius | Thickness | Glass | Semi-diameter | Conic | Y Decenter | X Tilt |
|---|---|---|---|---|---|---|---|
| Obj. | Infinity | Infinity | | | | | |
| Stop | Infinity | 2.50000000 | | 0.70000000 | | | |
| 2 | | 0.55572916 | | 0.00000000 | | −1.85000000 | 0.00000000 |
| 3 | −6.40200000 | −2.0899380 | Mirror | 2.66750000 | −1.00000000 | | |
| 4 (even asphere) | −6.75832363 | 4.53098674 | Mirror | 0.99058691 | −25.83438151 | 0.00000000 | 0.00000000 |
| 5 | −3.69301585 | 0.60000000 | Silica | 1.62000000 | −0.13663366 | | |
| 6 | | 0.00000000 | | 0.00000000 | | −0.8733848 | 7.19051979 |
| 7 (even asphere) | −2.59180923 | −0.2400000 | | 1.80000000 | 0.00000000 | 0.00000000 | 0.00000000 |
| 8 | | −0.2492138 | | 0.00000000 | | −1.31831480 | 19.29910712 |
| 9 | | 0.40000000 | | 0.00000000 | | 0.14943671 | −17.21405799 |
| 10 (even asphere) | 3.84183688 | 0.60000000 | Cleartran | 0.58048084 | −4.10947089 | 0.00000000 | 0.00000000 |
| 11 | — | 0.00000000 | | 0.00000000 | — | −0.59858127 | 3.79536692 |
| 12 (even asphere) | −8.08165279 | 0.00000000 | | 0.95263564 | 0.00000000 | 0.00000000 | 0.00000000 |
| 13 | | 2.92593467 | | 0.00000000 | | 0.31131739 | 10.00003101 |
| 14 | | 0.00000000 | | 0.00000000 | | 0.00000000 | −22.51149289 |
| 15 | | 0.00000000 | | 0.00000000 | | 0.85944796 | 0.00000000 |
| 16 | | 0.00000000 | | 0.00000000 | | 0.00000000 | −17.67266244 |
| 17 | Infinity | 0.00000000 | Mirror | 0.25042922 | 0.00000000 | | |
| 18 | | 0.00000000 | | 0.00000000 | | 0.00000000 | 17.67266244 |
| 19 | | 0.00000000 | | 0.00000000 | | −0.85944796 | 0.00000000 |
| 20 | | −0.5397976 | | 0.00000000 | | | −22.51149289 |
| 21 | | 0.00000000 | | 0.00000000 | | 0.00000000 | −7.63165175 |
| 22 | | 0.00000000 | | 0.00000000 | | 0.27474451 | 0.00000000 |
| Image | Infinity | | | 6.3853045E−05 | 0.00000000 | | |

Figure 6:
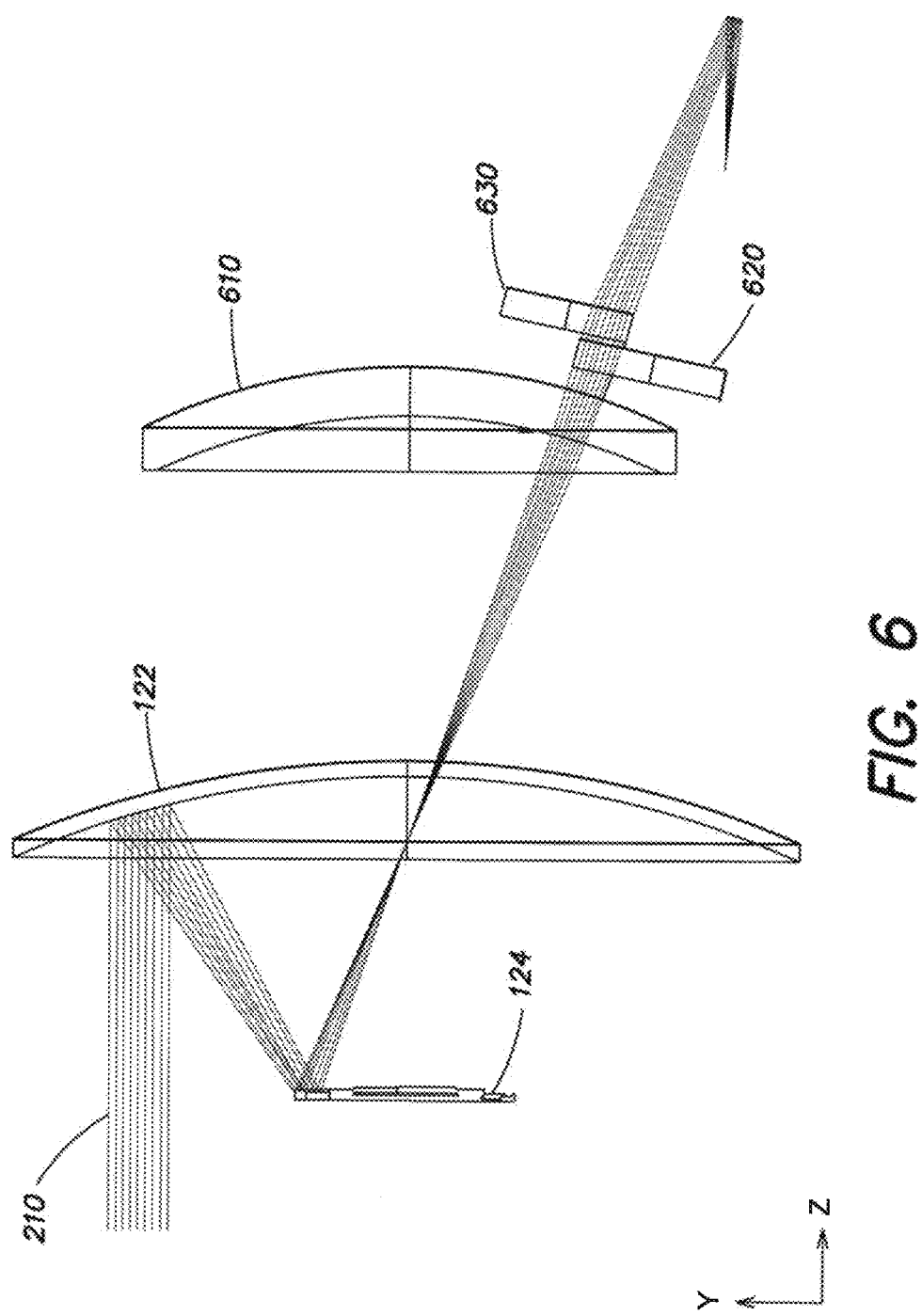
FIG. 6 is a ray trace of one example of an optical system including a three lens illuminator, according to aspects of the invention.

Table 2 below provides an optical prescription for an example of an optical system including a three lens (610, 620, and 630) illuminator and corresponding to the ray trace illustrated in FIG. 6. The optical prescription for this example of the optical system may be described using an equation for each surface which is an industry standard and which would be known to those skilled in the art. It is to be appreciated however, that the prescription given in Table 2 is merely exemplary, and that the prescriptions of various embodiments of the optical system are determined by the intended imaging task to be performed by the optical system. The example corresponding to the prescription given in Table 2 has a 5.335 inch telescope aperture. In the example corresponding to the prescription given in Table 2, some elements have a Y decenter and some have a tilt about X, as shown in the table. For all surfaces listed in Table 2, there is zero degree X decenter and 0 degree tilt about either Y or Z.

TABLE 2

| Surface | Radius | Thickness | Glass | Semi-diameter | Conic | Decenter Y | Tilt About X |
|---|---|---|---|---|---|---|---|
| Obj. | Infinity | Infinity | | 0.00000000 | 0.00000000 | | |
| Stop | Infinity | 2.50000000 | | 0.20000000 | 0.00000000 | | |
| 2 | | 0.55572916 | | 0.00000000 | | −1.80000000 | |
| 3 | −6.40200000 | −2.08993800 | Mirror | 2.66750000 | −1.00000000 | | 0.00000000 |
| 4 (even asphere) | −6.75832363 | 4.53098674 | Mirror | 0.74285859 | −25.8343815 | 0.00000000 | 0.00000000 |
| 5 | −3.69301585 | 0.35000000 | Silicon | 1.62000000 | −0.13663366 | | |
| 6 | −4.00000000 | −0.17551414 | | 1.80000000 | 0.00000000 | | |
| 7 | | 0.00000000 | | 0.00000000 | | −1.17188221 | 20.43165866 |
| 8 | | 0.20000000 | | 0.00000000 | | −0.40021519 | −8.39618462 |
| 9 | 8.12043527 | 0.20000000 | Silicon | 0.60000000 | −14.3107421 | | |
| 10 | Infinity | 0.05000000 | | 0.49645348 | 0.00000000 | | |
| 11 | | 0.00000000 | | 0.00000000 | | 0.63244622 | 0.00000000 |
| 12 | Infinity | 0.20000000 | Silicon | 0.60000000 | 0.00000000 | | |
| 13 | −8.12043527 | 0.00000000 | | 0.60000000 | −14.3107421 | | |
| 14 (fold mirror) | | 2.12583726 | | 0.00000000 | | −0.38657392 | 0.00000000 |
| 15 (scan mirror) | | 0.00000000 | | 0.00000000 | | −0.38657392 | 0.00000000 |
| 16 | Infinity | 0.00000000 | Mirror | 0.04453949 | 0.00000000 | | |
| 17 (focal pt tilt) | | −1.03634907 | | 0.00000000 | | 6.6363E−003 | 0.00000000 |
| Image | Infinity | — | — | 2.8958E−004 | 0.00000000 | | |

Thus, aspects and embodiments provide a dual-use optical system in which the aperture and foreoptics, such as the telescope 120 discussed above, may be shared by both a primary optical path and a secondary, off-axis, optical path. Such a dual-use system may provide an efficient packaging solution for aperture-constrained applications, for example.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical system comprising:
   an optical telescope including a plurality of mirrors optically coupled together and configured to receive and direct first light rays through an entrance aperture of the optical system along a primary optical path;
   a detector positioned behind the optical telescope in the primary optical path and configured to receive the first light rays from the optical telescope; and
   an optical sub-system positioned behind the optical telescope and configured to form a secondary optical path between the entrance aperture of the optical system and the optical sub-system, the optical telescope being positioned at least partially in the secondary optical path and configured to direct second light rays along the secondary optical path;
   wherein the optical telescope includes:
      a primary mirror disposed proximate the entrance aperture and configured to receive and reflect the first light rays;
      a secondary mirror configured to receive the first light rays reflected from the primary mirror and to reflect the first light rays;
      a tertiary mirror configured to receive the first light rays reflected from the secondary mirror and to reflect the first light rays;
      a quaternary mirror configured to receive the first light rays reflected from the tertiary mirror and to reflect the first light rays toward the detector; and
      a field lens optically coupled to the quaternary mirror and configured to receive the first light rays reflected from the quaternary mirror and to focus the first light rays onto the detector; and
   wherein the tertiary mirror includes an aperture positioned along the primary optical path, the detector is positioned behind the aperture, and the quaternary mirror is configured to reflect and direct the first light rays through the aperture toward the detector.

2. The optical system of claim 1, wherein the optical sub-system is an imager configured to receive the second light rays, the optical telescope being configured to direct the second light from the entrance aperture of the optical system along the secondary optical path to the imager, and wherein the imager includes a second detector configured to receive the second light rays and produce an image therefrom.

3. An optical system comprising:
   an optical telescope including a plurality of mirrors optically coupled together and configured to receive and direct first light rays through an entrance aperture of the optical system along a primary optical path;
   a detector positioned behind the optical telescope in the primary optical path and configured to receive the first light rays from the optical telescope; and
   an illuminator positioned behind the optical telescope so as to form a secondary optical path between the entrance aperture of the optical system and the illuminator, the secondary optical path being off-axis with respect to the primary optical path, and the illuminator being configured to produce second light rays and to direct the second light rays to the optical telescope, the optical telescope being positioned at least partially in the secondary optical path and configured to transmit the second light rays along the secondary optical path through the entrance aperture of the optical system.

4. The optical system of claim 3, wherein the optical telescope includes:
   a primary mirror disposed proximate the entrance aperture and configured to receive and reflect the first light rays;
   a secondary mirror configured to receive the first light rays reflected from the primary mirror and to reflect the first light rays;
   a tertiary mirror configured to receive the first light rays reflected from the secondary mirror and to reflect the first light rays;
   a quaternary mirror configured to receive the first light rays reflected from the tertiary mirror and to reflect the first light rays toward the detector; and
   a field lens optically coupled to the quaternary mirror and configured to receive the first light rays reflected from the quaternary mirror and to focus the first light rays onto the detector.

5. The optical system of claim 4, wherein the tertiary mirror includes an aperture positioned along the primary optical path, the detector is positioned behind the aperture, and the quaternary mirror is configured to reflect the first lights to direct the first light rays through the aperture toward the detector.

6. The optical system of claim 1, wherein the primary mirror and the secondary mirror are rotationally symmetric about an optical axis coincident with the primary optical path.

7. An optical system comprising:
   a detector;
   an optical telescope configured to receive and direct first light rays through an entrance aperture of the optical system along a primary optical path to the detector, the optical telescope including:
     a primary mirror disposed proximate the entrance aperture and configured to receive and reflect the first light rays;
     a secondary mirror configured to receive the first light rays reflected from the primary mirror and to reflect the first light rays;
     a tertiary mirror configured to receive the first light rays reflected from the secondary mirror and to reflect the first light rays;
     a quaternary mirror configured to receive the first light rays reflected from the tertiary mirror and to reflect the first light rays toward the detector; and
     a field lens optically coupled to the quaternary mirror and configured to receive the first light rays reflected from the quaternary mirror and to focus the first light rays onto the detector; and
   an illuminator positioned behind the optical telescope and configured to form a secondary optical path between the entrance aperture of the optical system and the optical sub-system, the illuminator being configured to produce second light rays and to direct the second light rays to the optical telescope, the optical telescope being positioned at least partially in the secondary optical path and configured to transmit the second light rays along the secondary optical path through the entrance aperture of the optical system.

8. The optical system of claim 7, wherein the optical sub-system includes a first lens having a first surface and positioned such that the first surface is coincident with a surface of the tertiary mirror, the first lens being positioned off center and within the primary optical path, and the optical sub-system being configured to direct the second light rays through the first lens.

9. The optical system of claim 8, wherein the first lens is configured to direct the second light rays to the secondary mirror, the secondary mirror is configured to receive and to reflect the second light rays toward the primary mirror, and the primary mirror is configured to receive the second light rays reflected from the secondary mirror and to reflect the second light rays toward the entrance aperture.

10. The optical system of claim 8, wherein the tertiary mirror includes an aperture configured to accommodate the first lens, and wherein the first lens has a diameter approximately the same as a diameter of the aperture.

11. The optical system of claim 8, further comprising a dichroic coating disposed over the surface of the tertiary mirror.

12. The optical system of claim 11, wherein the detector is an infrared detector and the first light rays are infrared light rays.

13. The optical system of claim 12, wherein the tertiary mirror is silicon.

14. The optical system of claim 7, wherein the secondary optical path is off-axis with respect to the primary optical path.

15. The optical system of claim 1, wherein the secondary optical path is off-axis with respect to the primary optical path.

16. The optical system of claim 1, wherein the optical sub-system is an illuminator configured to produce the second light rays and to direct the second light rays to the optical telescope, the optical telescope being configured to transmit the second light rays along the secondary optical path through the entrance aperture of the optical system.

17. A method of sharing a common optical aperture between an imaging optical system and an illuminator, the method comprising:
   receiving first light rays through the optical aperture;
   directing the first light rays along a primary optical path to an imaging detector of the imaging optical system using an optical telescope;
   producing second light rays with the illuminator;
   transmitting the second light rays from the illuminator to the optical telescope; and
   transmitting the second light rays along a secondary optical path that is off center with respect to the primary optical path through the optical aperture using the optical telescope.

18. The method of claim 17, wherein directing the first light rays along the primary optical path to the imaging detector includes:
   reflecting the first light rays from a primary mirror disposed proximate the entrance aperture;
   receiving the first light rays reflected from the primary mirror at a secondary mirror, and reflecting the first light rays from the secondary mirror;
   receiving the first light rays reflected from the secondary mirror at a tertiary mirror, and reflecting the first light rays from the tertiary mirror;
   receiving the first light rays reflected from the tertiary mirror at a quaternary mirror, and reflecting the first light rays from the quaternary mirror toward the detector; and receiving the first light rays reflected from the quaternary mirror at a field lens, and focusing the first light rays onto the detector using the field lens.

19. The method of claim 18, wherein reflecting the first light rays from the quaternary mirror toward the detector includes directing the first light rays through an aperture in the tertiary mirror to the field lens.

* * * * *